(12) United States Patent
Akutagawa

(10) Patent No.: US 6,361,811 B2
(45) Date of Patent: Mar. 26, 2002

(54) METHOD FOR MANUFACTURING A DECORATIVE FOOD

(76) Inventor: Tokuji Akutagawa, 7-1-30-601, Komagome, Toshima-ku, Tokyo (JP), 170-0003

( * ) Notice: Subject to any disclaimer, the term of this patent is extended or adjusted under 35 U.S.C. 154(b) by 0 days.

(21) Appl. No.: 09/764,468

(22) Filed: Jan. 17, 2001

Related U.S. Application Data

(62) Division of application No. 09/332,359, filed on Jun. 10, 1999, now Pat. No. 6,200,125.

(30) Foreign Application Priority Data

Jun. 12, 1998 (JP) ............................................. 10-165674

(51) Int. Cl.⁷ ...................... B29C 42/26; B29C 45/16; A23G 1/00; A23G 1/20; A23G 3/28
(52) U.S. Cl. ...................... 426/249; 426/660; 426/516; 426/515; 426/512; 425/462; 425/463; 425/130; 425/133.1
(58) Field of Search ................................. 425/462, 463, 425/130, 133.1, 131.1, 376.1, 118/14; 426/249, 660, 516, 306, 307, 512, 515

(56) References Cited

U.S. PATENT DOCUMENTS

| | | | |
|---|---|---|---|
| 1,628,251 A | * | 5/1927 | Laskey |
| 1,714,234 A | * | 5/1929 | Ost |
| 1,765,874 A | * | 6/1930 | Laskey |
| 1,839,719 A | * | 1/1932 | Walter |
| 3,851,084 A | * | 11/1974 | Rossen et al. |
| 3,876,743 A | * | 4/1975 | Soderlund et al. |
| 4,504,511 A | * | 3/1985 | Binley |
| 4,925,380 A | * | 5/1990 | Meisner |
| 4,938,128 A | * | 7/1990 | Knebl |
| 5,019,404 A | * | 5/1991 | Meisner |
| 5,443,856 A | * | 8/1995 | Akutagawa et al. |
| 5,670,185 A | * | 9/1997 | Heck et al. |
| 5,700,494 A | * | 12/1997 | Masse et al. |
| 5,762,971 A | * | 6/1998 | Schirmer |
| 6,000,926 A | * | 12/1999 | Schirmer |
| 6,039,554 A | * | 3/2000 | Akutagawa |
| 6,099,880 A | * | 8/2000 | Klacik et al. |
| 6,200,125 B1 | * | 3/2001 | Akutagawa |

FOREIGN PATENT DOCUMENTS

| | | | |
|---|---|---|---|
| EP | 0288120 | * | 10/1988 |
| FR | 847554 | * | 10/1939 |
| GB | 2156727 | * | 10/1985 |
| WO | WO 98/51471 | * | 11/1998 |

\* cited by examiner

Primary Examiner—Cynthia L. Nessler
(74) Attorney, Agent, or Firm—Crosby, Heafey, Roach & May

(57) ABSTRACT

A decorative food formed of a plurality of kinds of fluid food materials and manufactured by using a mold is provided. The decorative food has an outside shape thereof conforming to an interior surface of the mold inclusive of an opening of said mold. The decorative food has a colored pattern divided into multiple divisions extending up to a central portion of the decorative food, in a direction to extrude the food materials into the mold, the colored pattern being formed such that the multiple divisions are arranged with substantially the same ratio at any of a cross sectional area intersecting the direction to extrude the food materials, and wherein the decorative food contains therein a foodstuff. Also disclosed are an apparatus and method for manufacturing the decorative food.

5 Claims, 4 Drawing Sheets

FIG. 1(a)
FIG. 1(b)
FIG. 1(c)
FIG. 1(d)
FIG. 1(e)
FIG. 1(f)
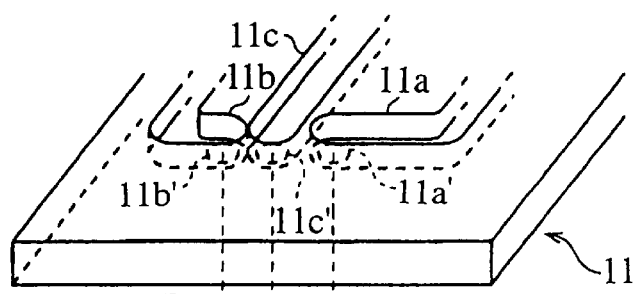
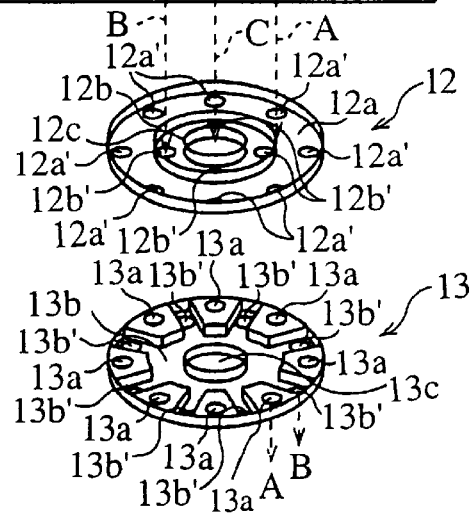
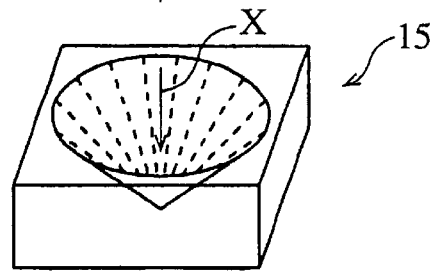
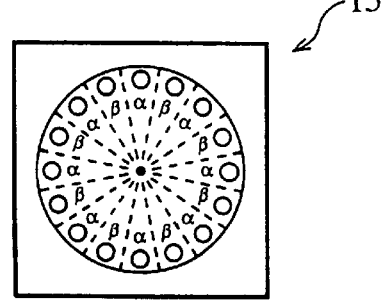

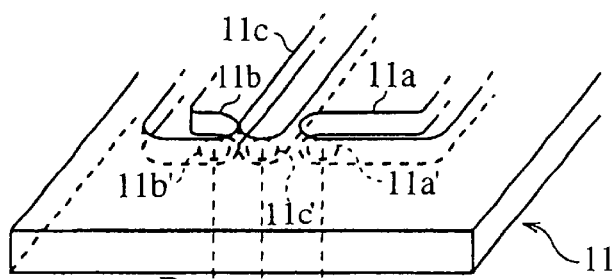
FIG. 3(a)
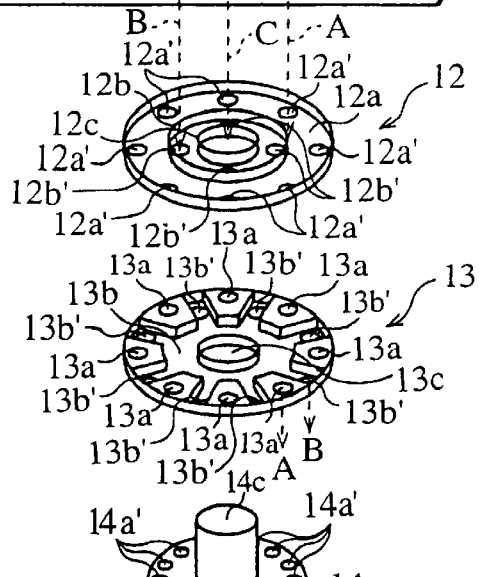
FIG. 3(b)
FIG. 3(c)
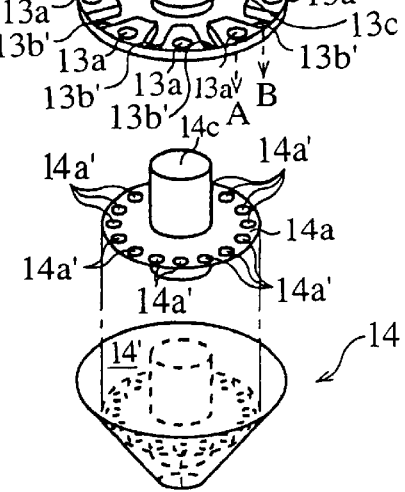
FIG. 3(d)
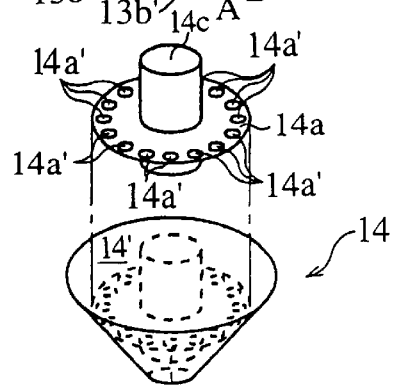
FIG. 3(e)
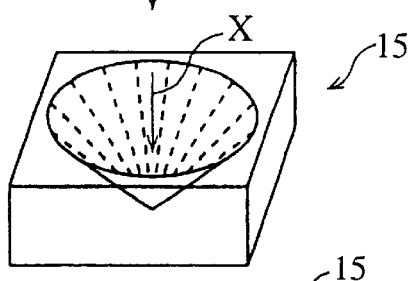
FIG. 3(f)
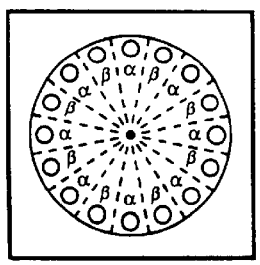

METHOD FOR MANUFACTURING A DECORATIVE FOOD

The present application is a divisional of U.S. application Ser. No. 09/332,359 filed on Jun. 10, 1999, now U.S. Pat. No. 6,200,125.

FIELD OF THE INVENTION

This invention relates to a decorative food, and more particularly to a decorative food which has a food stuff enclosed by food materials, and to a method and an apparatus for manufacturing the same.

DESCRIPTION OF RELATED ART

There is proposed a chocolate which has a foodstuff, such as liquor, fruit, nuts, or the like enclosed therein. There is also known a chocolate, for instance, from JP-A-9-23818, which is formed of a plurality of kinds of chocolate materials and has striped pattern on its surface.

The first mentioned chocolate having the foodstuff enclosed therein is excellent in taste and flavor when the foodstuff and the chocolate are simultaneously taken into the mouth of a consumer. However, the chocolate itself is formed of a single material, and therefore its taste and decorated appearance on its surface are monotonous and unfancy. On the other hand, according to the latter mentioned prior art reference, the chocolate has the striped pattern formed in the direction to extrude two kinds of the chocolate materials. In this chocolate, however, one of the two chocolate materials forms an internal base, and the other one forms the striped pattern only on the surface of the base. Therefore, when it is taken into the mouth, flavor of mixture of the two kinds of chocolate is relished only at the beginning, but the constant taste or flavor of the mixture cannot be enjoyed to the end. In addition, the latter mentioned chocolate formed of one chocolate material as a base and the other chocolate material adhering to the base is not different from the conventional decorative food formed of a base material such as biscuit and chocolate adhering to the base. The only difference or improvement in this latter mentioned chocolate from the traditional decorative food is that the chocolate has the smooth surface due to casting of the chocolate materials into a mold. As a result, the latter mentioned chocolate is limited in formation of patterns as well as in designing. Above all, a chocolate formed by only two kinds of chocolate materials cannot cope with diversified demands of consumers in these days, and further there is something missing in this chocolate as a decorative chocolate having unique taste and flavor.

In the prior art cited above, the nozzle as a chocolate material charging device is constructed such that a fluid chocolate material is passed through a central cylinder from the upper portion to the lower portion thereof, and another fluid chocolate material is supplied into an inner cylinder and an outer cylinder surrounding the former, thereby forming a chocolate having a smooth striped pattern thereon. However, since the nozzle is in the form of a vertically-elongated cylinder, the nozzle has the disadvantage that the cleaning and clogging-prevention-operations for the inner and outer cylinders after the operation of the device become complicated, resulting in an increase in the maintenance cost. Further, in the case of the above-described nozzle, the relationship between one kind of chocolate material and the other kind is like main-subordinate relation, so that the formation of decorative pattern is limited.

SUMMARY OF THE INVENTION

It is therefore an object of the present invention to provide a decorative food such as a decorative chocolate having original taste and flavor, which is formed not only of a plurality of kinds of fluid food materials but also of a different foodstuff enclosed inside.

It is another object of the invention to provide a decorative food which has a pattern formed therein that substantially conforms to a predetermined pattern, by extruding a plurality of kinds of fluid food materials while dispensing with a main-subordinate relationship between the food materials.

It is a further object of the invention to provide a decorative food in which first taste spread in the mouth and later taste tasted after the food progressively melts to expose the interior thereof are maintained to substantially the same taste by maintaining formulated ratios of the exterior and interior of the plurality of kinds of fluid food materials to be constant, and finally further different taste can be relished.

It is still further object of the invention to provide a decorative food which has a pattern such that pattern elements are arranged with substantially the same ratio in any cross sectional area, by making a mold of the apparatus taper down from an opening of the mold toward a lower portion of the same.

It is an even further object of the invention to provide a food which is original and rich in decorativeness, by forming gradation at boundary portions between the elements of the pattern.

To attain the above objects, according to an aspect of the invention, there is provided a decorative food formed of a plurality of kinds of fluid food materials and manufactured by using a mold, wherein the decorative food has an outside shape thereof conforming to an interior surface of the mold inclusive of an opening of the mold, wherein the decorative food has a colored pattern divided into multiple divisions extending up to a central portion of the decorative food, in a direction to extrude the fluid food materials into the mold, the colored pattern being formed such that the multiple divisions are arranged with substantially the same ratio when cut at any of a cross sectional area intersecting the direction to extrude the food materials, and wherein the decorative food has a food stuff enclosed therein.

In the pattern having the multiple divisions, one kind of fluid food material is divided into at least two divisions. The relationship between the divisions is as follows: If holes formed in the nozzle are equal in diameter to each other, the food pattern has its area divided into equal divisions. The amount of the fluid food material present in each division can be varied by controlling a discharge amount of the fluid food material from each hole, or by changing the diameter of the same.

The foodstuffs to be enclosed in the chocolate include liquor such as wine, liqueur, and fruit wine, viscous foods such as different chocolate from the base chocolate, jelly, bean, jam, and fruit jam inclusive of strawberry jam and marmalade, and beverages such as milk, coffee, and juice. Out of the above-mentioned items, one or a plurality of the items may be selected. Further, the pattern of the decorative food may be molded by means of an inverse conical mold or an inverse trapezoidal mold. The mold may progressively taper down from an opening thereof for receiving fluid food materials toward a lower portion thereof. Therefore, a plurality of the fluid food materials extruded into the mold form an umbrella shape which progressively tapers down from the opening of the mold toward the lower portion to concentrate on one point on the bottom. Further, a plurality of kinds of the fluid food materials separately extruded from the nozzle are gradated at boundaries between the respective fluid food materials, i.e. edges of the respective divisions of the pattern, by means of a gradation plate, and therefore a decorative food with a totally refined pattern can be obtained.

In another aspect of the invention, an object of the invention is to provide an apparatus for manufacturing a decorative food, which is designed such that a nozzle of a charging device of the apparatus is made extremely compact in shape and thin in thickness compared with a conventional nozzle, and at the same time a variety of decorative patterns can be formed within the compact and thin nozzle, and also to provide a method by using the same.

It is another object of the present invention to provide an apparatus for manufacturing a decorative food, in which the nozzle has a plurality of passages formed therein, and the fluid food materials are charged into the passages and then discharged therefrom on a material-by-material basis, followed by integrally molding the fluid food materials. As a result, the decorative food can be formed into a pattern set beforehand.

It is a further object of the invention to provide an apparatus for manufacturing a decorative food, in which the nozzle includes one or more nozzle pieces arranged on each other and functions to progressively branches each of the fluid food materials to multiple divisions, to thereby form the decorative food with a complicated pattern designed based on the arrangement of outlets of the nozzle.

To attain the above objects, according to another aspect of the present invention, there is provided an apparatus for manufacturing a decorative food, including a charging device for charging a plurality of kinds of fluid food materials into a mold, a hardening device for hardening the charged fluid food materials to obtain the decorative food, and a demolding device for taking off the hardened decorative food out of the mold, the charging device comprising a container section for accommodating each of the plurality of kinds of the fluid food materials on a material-by-material basis, and a nozzle section for feeding the plurality of kinds of the fluid food materials from the container section at a predetermined amount, the nozzle section including a nozzle mounting plate and a nozzle piece, the nozzle mounting plate having first passages formed therein for delivering the fluid food materials fed from the container section on a material-by-material basis, and upper holes formed in the first passages for feeding the fluid food materials to the nozzle piece placed below the plate on the material-by-material basis, the nozzle piece having second passages formed therein for moving and spreading the fluid food materials fed from the upper holes in a horizontal direction on the material-by-material basis, and lower holes formed in the second passages, on the material-by-material basis, the lower holes being larger in number than the upper holes, whereby the fluid food materials are separately extruded into the mold placed below the nozzle piece, the nozzle mounting plate and the nozzle piece each having a food guide hole penetrating in a vertical direction for feeding a foodstuff so that the foodstuff is enclosed by the fluid food materials.

To enclose the above foodstuff by a plurality of the fluid food materials, in addition to the upper holes and the lower holes for extruding the fluid food materials, food guide holes may be formed, for instance, at a central portion of the nozzle mounting plate and the nozzle piece which form a nozzle section, so as to be placed in a line. The foodstuff can be enclosed by the fluid food materials through the thus formed food guide holes. Alternatively, one of the upper holes formed in the nozzle mounting plate, for extruding the fluid food material may be used as the food guide hole, and a lower hole which is formed in the nozzle piece at a location vertically just below the upper hole and different from the lower holes for extruding the fluid food materials into the mold may be used as the food guide hole. As a result, the foodstuff can be charged into the fluid food materials through these upper and lower holes, and enclosed by the same.

To attain the above described objects, according to a further aspect of the invention, there is provided a method for manufacturing a decorative food, including the steps of charging a plurality of kinds of fluid food materials into a mold, hardening the charged fluid food materials to obtain the decorative food, and taking off the hardened decorative food out of the mold, the charging step comprising the steps of extruding the plurality of kinds of the fluid food material in a multiple-string shape on a material-by-material basis, and discharging a foodstuff into the fluid food materials in the middle of the step of extruding the fluid food materials, the step of extruding the fluid food materials including the steps of branching one of the fluid food materials in a horizontal direction to subdivide the same, branching another one of the fluid food materials in a horizontal direction to subdivide the same, and extruding the one of the subdivided fluid food materials and the another one of the subdivided fluid food materials in the alternate-multiple-string shape into the mold, to thereby form decoration with a diversified pattern.

Each hole of the nozzle for extruding the fluid food materials in the multiple-string shape is kept from contact with the nozzle hole adjacent thereto, i.e. the holes are spaced from each other, and therefore the strings are out of contact with each other during discharging. The strings of the materials are then dropped into a hopper placed between the nozzle section and the mold, or directly into the mold. Accordingly, the fluid food materials in the string shape extruded from the holes of the nozzle are brought into contact with each other and integrated, followed by hardening of the same in the mold to form the decorative pattern. To enclose the foodstuff by the fluid food materials, a control section is operated to control the charging device. First, the string-shaped fluid food materials are discharged into the mold, and the foodstuff is discharged to the central portion of the fluid food materials in the middle of discharging. Continuation of the step of extruding the string-shaped materials can finish manufacturing of the decorative food.

BRIEF DESCRIPTION OF THE DRAWINGS

FIG. 1 is an exploded perspective view of a nozzle portion of charging device as a characteristic part of a decorative food manufacturing apparatus according to the embodiment of the present invention, wherein FIG. 1(a) shows a portion of a nozzle mounting plate forming a part of the nozzle section, FIGS. 1(b) and 1(c) respectively show two nozzle pieces to be attached in layers to the lower surface of the nozzle mounting plate, FIG. 1(d) is a perspective view of a hopper arranged below the nozzle piece shown in FIG. 1(c), FIG. 1(e) is a perspective view of one of molds which are sequentially and intermittently fed by a belt conveyer leaving a slight interval from the hopper, and FIG. 1(f) is a plan view of the mold shown in FIG. 1(e) in which areas defined by dotted lines and designated by reference symbols α and β show virtual areas for two kinds of fluid food materials extruded into the mold.

FIG. 2 shows a decorative food produced by the apparatus shown in FIG. 1, wherein

FIG. 3 is an exploded perspective view of a nozzle section of charging device as a characteristic part of a decorative food manufacturing apparatus according to another embodiment of the present invention, wherein FIG. 3(a) shows a portion of a nozzle mounting plate of the nozzle section, and FIGS. 3(b) and 3(c) respectively show two nozzle pieces to be attached in layers below the nozzle mounting plate, FIG. 3(d) is a perspective view of a hopper in which a perforated plate is fitted, FIG. 3(e) is a perspective view of a mold, and FIG. 3(f) is a plan view of the mold shown in FIG. 3(e) in which areas defined by dotted lines and designated by reference symbols α and β respectively show areas into which two kinds of fluid food materials are respectively introduced.

FIG. 4 shows a decorative food produced by the apparatus shown in FIG. 3, wherein

PREFERRED EMBODIMENT OF THE INVENTION

Figure 2A:
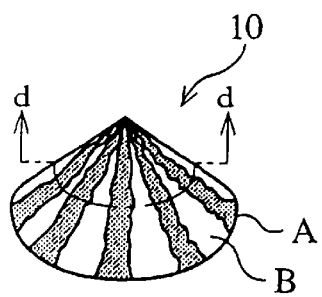
FIG. 2(a) is a perspective view of the decorative food.
Figure 2B:
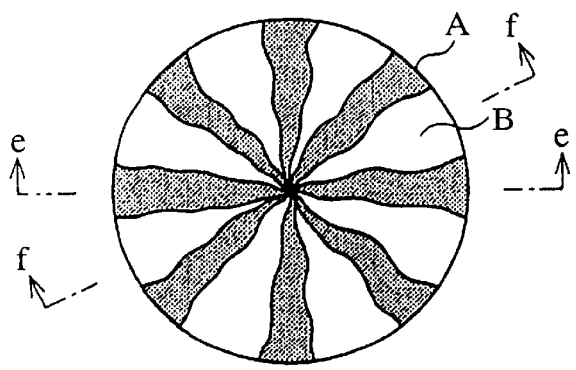
FIG. 2(b) is a plan view of the same.
Figure 2C:
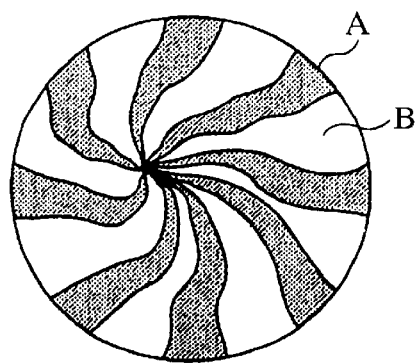
FIG. 2(c) is a bottom view of the same.
Figure 2D:
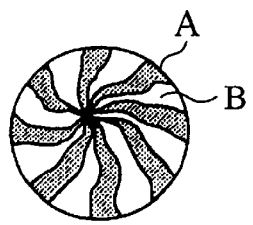
FIG. 2(d) is a sectional view taken along the d—d line of FIG. 2(a)

A decorative chocolate formed of a plurality of kinds of fluid food materials of the present invention has a contoured or flat surface patterns formed of a combination of chocolates of usual chocolate color (brown) and white color or more than two colors including natural and artificial coloring agents for various kinds of foods. The raw fluid chocolate material is tempered at a viscosity and a temperature substantially the same as those of the usual fluid chocolate material, and no problem arises if the material has a viscosity allowing the material to pass through the nozzle holes.

Any mold may be used for forming a chocolate only if it is in the form of a vessel having an upper opening and made of a material, such as polycarbonate, selected from among resins which are resistant against heat, light in weight, and excellent in moldability. Within the mold, the size and shape of each of a plurality of fluid food materials are determined by the amount, position, and number of the materials to be injected through the nozzle, and the boundary portions of the pattern are made integral with each other by crystallization of the fluid food materials.

The decorative pattern is formed such that the fluid food materials are divided into a number of portions in the string shape along the direction in which the materials are extruded into the mold so that the striped portions appear in the same dividing ratio at any cross section of the pattern throughout the entire length thereof. Such pattern as a whole can represent a bird, animal, person, or other various characters depending on the configuration of the inner surface of the mold including its opening.

The configuration of the above-described decorative pattern is defined by a single mold through a single nozzle arranged above the mold, but it is also possible to produce a plurality of repeated patterns by simultaneously extruding the materials through a plurality of nozzles arranged above the mold. In that case, it is advantageous to make the fluid food materials have the same viscosity from the point of view of designing the apparatus for producing the above-described repeated patterns or in view of the simplification of the equipment. However, even when the fluid food materials to be extruded from the nozzles have different viscosity indices, if they are quantitatively extruded into a mold through a plurality of nozzles, the same pattern as a whole can be obtained in the mold.

Accordingly, since the decorative pattern is so arranged that at least two or more kinds of fluid food materials injected into the mold are settled in their predetermined areas, respectively, the materials appear in the same pattern, or at least the same ratio (on a reduced or enlarged scale) at any cross section of the chocolate throughout the length thereof.

To gradate the boundaries of the portions of the pattern in the decorative food is to make obscure the color tones at the boundaries of the pattern portions by mixing the fluid food materials of different colors at their adjoining portions before the materials are settled in their predetermined areas of the mold.

Further, it is possible to form a more complicated pattern on a decorative food by directly printing an edible pattern on a part or the whole of the inner surface of the mold by a silk printing method or by transferring a printed pattern on the bottom of the mold to the fluid food material using a transfer film.

As the foodstuff to be enclosed in the decorative food of the present invention, there are considered liquors such as liqueurs, vodka, wine and whisky, pasty (viscous) foods such as strawberry jam, jelly, and sweet bean paste, juices such as melon, apple, banana, and pine apple juices and the like.

The charging device of the decorative food manufacturing apparatus of the present invention has a container section (not shown) for accommodating fluid food materials and a nozzle section (not shown) for supplying a predetermined amount of the fluid food materials through a cylinder, and has already been put to practical use. The characteristics of the present invention reside in the structure of the nozzle section.

More specifically, the nozzle section is characterized by the nozzle mounting plate and the nozzle piece arranged below the former. The nozzle mounting plate is formed integrally by die-casting or cutting process, and provided between the substrate and an upper plate (not shown) with a plurality of first passages for allowing the plurality of kinds of fluid food materials to respectively pass therethrough, and a plurality of upper holes penetrating through the first passages so that the materials may be supplied to the nozzle piece arranged below the plate. The nozzle piece is provided with a plurality of second passages formed between the nozzle piece and the plate so as to receive the food materials coming from the plate and to allow the materials to move and spread in the horizontal direction, and with a plurality of lower holes larger in number than the upper holes and penetrating through the second passages so that the plurality of fluid food materials are dropped into the mold located therebelow.

The nozzle piece is in the form of a flat plate having a plurality of second passages and a plurality of lower holes, but it may be combined with another nozzle piece having third passages communicating with the lower holes and a plurality of second lower holes larger in number than the lower holes in the first nozzle piece so that the fluid food materials are spread and discharged into the mold through the second lower holes thereby producing a decorative food having a more complicated pattern. Further, by varying the position, diameter, and shape of each of the lower holes of each of the nozzle pieces, various kinds of patterns can be designed on the basis of their relationships with the shape of the mold.

The food guide holes are so formed as to extend vertically through the nozzle mounting plate and the nozzle pieces so that a foodstuff is enclosed by the plurality of fluid food material. The food guide holes may be formed as the upper and lower holes along the same vertical line, or they may be formed with vertically extending small holes separately from the upper and lower holes.

The decorative food manufacturing method of the present invention makes it possible to dispose a foodstuff in a decorative food by carrying out the steps of extruding a plurality of kinds of fluid food materials in a multiple-string shape on a material-by-material basis from around the nozzle piece of the charging device in a timing determined by the control section (not shown) of the apparatus, and discharging a foodstuff through the food guide holes in the middle of the first-mentioned step in a delayed timing while continuing the fluid food material extrusion step even after the discharge of the foodstuff.

As the fluid food materials used in the present invention, there are, besides chocolate, sweet bean jelly, candies, ice creams, cheese, jelly, sponge cake, and boiled fish-paste with the inclusion of foods which are initially fluid and housed in containers in a solid or semi-solid state after being cooled or heated.

Further, the word "chocolate" appearing throughout the specification is used in a broad sense so that it includes various products such as semi-chocolate, chocolate confectioneries, semi-chocolate confectioneries, and the like.

The decorative food according to the present invention is produced in such a manner that a plurality of kinds of fluid food materials are subdivided into a number of sections in the direction of extrusion of the materials into the mold along the inner surface of the mold in substantially the same ratio in any cross section throughout the length of the food. Thus, unlike a conventional food made of two kinds of materials of which one forms a basic portion of the food and the other is added to the outer periphery of the former, one can enjoy a mixed flavor of the plurality of food materials from the beginning to the end. Further, it is possible with the present invention to obtain a decorative food added with a new, fresh flavor and taste by enclosing a different foodstuff in the plurality of kinds of food materials.

Further, the plurality of kinds of fluid food materials forming the decorative food of the present invention are not held in the so called main-subordinate relationship, and a variety of decorations having complicated patterns can be obtained through the lower holes of the nozzle piece. Thus, it is possible with the present invention to obtain a product having an added value in that it has a pattern which gives one an impression that the product is of high quality and which is quite different from that of any conventional product of the similar kind.

Further, the above-described decorative food can be demolded with ease unless the cavity of the mold is inversely tapered, and particularly, even when the mold is of inverted conical shape, a substantially equally-spaced striped pattern is maintained until the stripes gather together at the bottom of the mold.

According to the present invention, by arranging on the lower side of the nozzle mounting plate one or more nozzle pieces having horizontal spreading passages, the nozzle pieces become thin and compact, and even with such a nozzle piece, a decorative food having a considerably complicated pattern and enclosing a foodstuff therein can be produced through the horizontal passages and the small holes penetrating through the passages in the nozzle piece.

Further, by using this nozzle, it is possible to finish a complicated pattern by arranging the lower holes in the nozzle above the corresponding food material extrusion area in the mold. Especially, by laying two or more nozzle pieces one on another, a number of branched-off small holes are formed to enable a complicated pattern to be obtained and it is possible to enclose a liquid foodstuff therein.

Still further, by disposing a perforated plate between the nozzle piece and the mold, the boundaries of the adjoining portions of a pattern can be gradated.

EXAMPLES

Illustrative embodiments of the present invention will now be described with respect to decorative chocolates made of fluid chocolate materials as the fluid food materials by referring to the attached drawings, but the invention is not limited to chocolates.

Further, it should be noted that each of the decorative chocolates shown in the drawings is an inversion of what has been molded by a mold, and the surface thereof with the exception of its bottom surface corresponds to a part or the whole of the cavity of the mold used, and the bottom surface thereof corresponds to the opening portion of the mold excluding the internal surface portion of the mold.

Example 1

The parts shown in FIGS. 1(a) through 1(c) form themselves a nozzle section connected to a container section (not shown) of a charging device, and two kinds of fluid chocolate materials A and B different at least in color tones of white and brown (chocolate color) are injected into a mold 15 (FIG. 1(e)) through the nozzle section so that a decorative chocolate 10 shown in FIGS. 2(a) through 2(f) having the color pattern is produced. The nozzle section includes a nozzle mounting plate 11 and upper and lower nozzle pieces 12 and 13 attached to the nozzle mounting plate 11 on the lower surface thereof by means of screws.

More particularly, the nozzle-mounting plate 11 is provided, between the plate and an upper plate (not shown), with first passages 11a and 11b for separately guiding the fluid chocolate materials A and B in the horizontal direction from the container section, and these passages are respectively provided with upper holes 11a' and 11b' penetrating therethrough. Further, the nozzle piece 12 is in the form of a thin plate provided with concentrically divided second passages 12a (outside) and 12b (inside) for separately receiving and horizontally guiding the respective fluid chocolate materials A and B supplied through the upper holes 11a' and 11b', and first lower holes 12a' (a total eight arranged at equal intervals) and second lower holes 12b' (one at each of opposing positions) extending through the second passages 12a and 12b, respectively. Further, the nozzle piece 13 is provide with a total of eight third lower holes 13a respectively extending right below the first lower holes 12a' and adapted to allow the fluid chocolate material A from the holes 12a' to directly pass therethrough, third passages 13b for receiving the fluid chocolate material B from the second lower holes 12b' and spreading the material B in the horizontal and radial direction, and a total of eight fourth lower holes 13b' penetrating near the end of each third passage 13b.

At the same time, the nozzle mounting plate 11 is provided with a first passage 11c and an upper hole 11c separately from the first and second passages 11a and 11b, and the upper nozzle piece 12 is provided with a lower hole 12c passing through the center of the piece 12 right below the upper hole 11c, and the lower nozzle piece 13 is provided with a lower hole 13c passing through the center of the piece 13 right below the lower hole 12c.

Thus, the first through the third passages 11a, 12b, and 13b serve as divided chambers for separately guiding the fluid chocolate materials A and B in the horizontal direction, the two upper holes 11a' and 11b' and the first through the fourth lower holes 12a', 12b', 13a, and 13b' have the functions of supplying the materials downstream from the above passages. Thus, by arranging the above-described small holes in an alternate fashion, it is possible to form a striped pattern, or it is also possible to form a white color pattern in a brown background, depending on the manner of hole arrangement, for example, by a white-brown color arrangement.

Further, at a position right below the nozzle piece 13, there is arranged a funnel-shaped hopper 14, under which molds having a inverted conical cavity are intermittently carried by a separately arranged automatic endless conveyer. It should be noted that reference symbols α and β shown in FIG. 1(f) designate virtual divisional areas for the fluid chocolate materials A and B arranged in the mold in an alternate fashion so as to obtain a presupposed striped pattern representing a decorative chocolate.

Next, a method of manufacturing a decorative chocolate according to the present invention by using the above-described apparatus will be described.

First, the fluid chocolate materials A and B respectively contained in two container sections (not shown) of the charging device are separately supplied to the nozzle section through cylinders by predetermined amounts. When the materials A and B have reached the first passages 11a and 11b of the nozzle mounting plate 11 of the nozzle section, they are supplied to the lower nozzle piece 12 through the upper holes 11a' and 11b' in the first passages 11a and 11b. Then the fluid chocolate material A supplied to the nozzle piece 12 through upper hole 11a' spreads clockwise and counter-clockwise in an arc within the outer second passage 12a due to the extrusion pressure, and is directly extruded into the hopper 14 from the eight equally spaced first lower holes 12a' through the corresponding eight third lower holes 13a in the lower nozzle piece 13 closely adhered to the nozzle piece 12.

At the same time, the fluid chocolate material B supplied through the upper hole 11b' to the nozzle piece 12 spreads clockwise and counter-clockwise in the inner second passage 12b passes through the two second lower holes 12b' and spreads in the substantially radial third passages 13b in the lower nozzle piece 13. Then the spread material B is supplied to the hopper 14 through the eight fourth small holes 13b' arranged adjacent to the above-described lower holes 13a.

A total of sixteen strings of fluid chocolate materials A and B falling through the holes 13a and 13b' in the form of eight white strings and eight brown strings, respectively, fall down into the mold 15 (in the X-direction) while the adjoining strings are brought into contact with one another and compressed to become a single thick chocolate rod by the bottom hole of the hopper. However, since the rod is pasty, it gradually becomes swollen after its falling so that although the white and brown chocolate materials A and B forming the rod are in contact with each other at the bottom of the mold, the rod expands outwardly to correspond to the configuration of the inverted conical cavity of the mold whose diameter gradually becomes larger upward. In addition, due to the condition in which the fluid chocolate materials are supplied continuously through the hopper 14 located above (based on the theory of competition between the fluid food materials A and B of the same viscosity), the width of the white material and that of the brown material become larger so as to extend along the areas of α and β, respectively, and the distance between the materials becomes gradually larger (see FIG. 2).

Apart from the fluid chocolate materials A and B, a foodstuff C falls from the first passage 11c in the nozzle mounting plate 11 through the food guide holes 12c and 13c extending through the centers of the nozzle pieces 12 and 13, respectively. In this case, the supply timing of the foodstuff C is such that in the midway of the step of supplying the fluid chocolate materials A and B through the upper holes 11a', 11b', and lower holes 12a', 12b', and 13a, 13b', the foodstuff C is discharged into the fluid chocolate materials A and B. Even after stopping the supply of the foodstuff C, the extrusion of the fluid chocolate materials A and B is still continued so that the foodstuff is enclosed by the materials A and B, and introduced into the mold 15 through the hopper 14, thereby placed inside the decorative chocolate.

The chocolate materials A and B and the foodstuff C injected into the mold 15 by using the above-described nozzle section shown in FIGS. 1(a) through 1(d) are then solidified so that a decorative chocolate 10 having a pattern harmonized to a desired degree both visually and in taste is obtained.

Figure 2E:
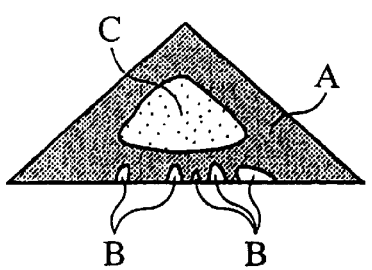
FIG. 2(e) is a sectional view taken along the e—e line of FIG. 2(b)
Figure 2F:
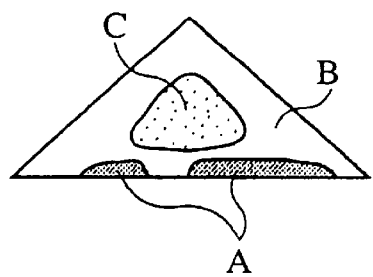
FIG. 2(f) is a sectional view taken along the f—f line of FIG. 2(b).
Figure 4A:
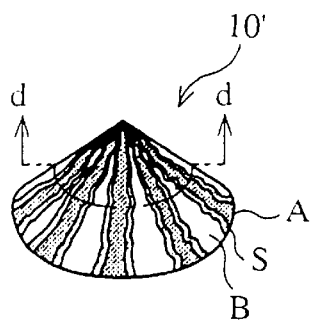
FIG. 4(a) is a perspective view of the decorative food.
Figure 4B:
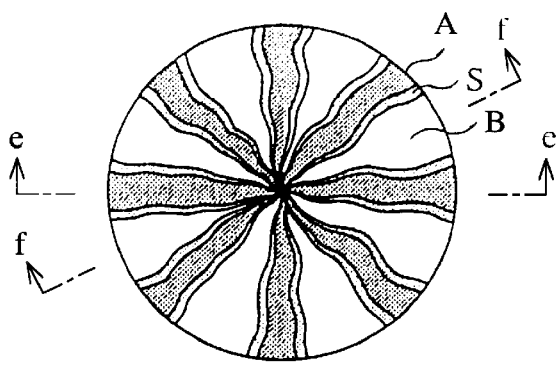
FIG. 4(b) is a plan view of the same.
Figure 4C:
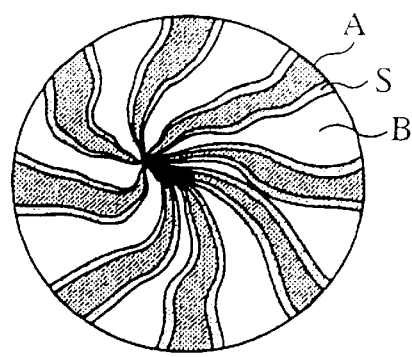
FIG. 4(c) is a bottom view of the same.
Figure 4D:
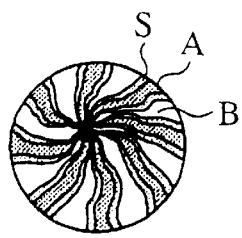
FIG. 4(d) is a sectional view taken along the d—d line of FIG. 4(c)
Figure 4E:
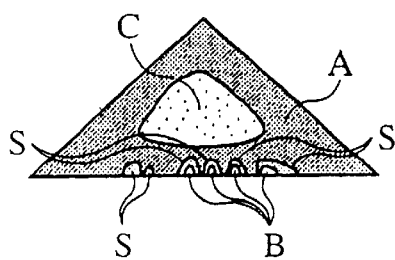
FIG. 4(e) is a sectional view taken along the e—e line of FIG. 4(b)
Figure 4F:
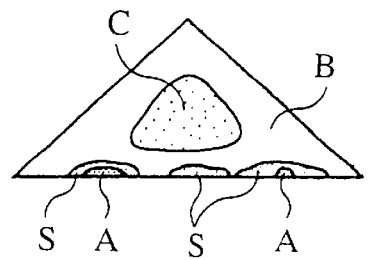
FIG. 4(f) is a sectional view taken along the f—f line of FIG. 4(b)

Various aspects of the chocolate 10 shown in FIGS. 2(a) through 2(d) are as a result of injection of a predetermined amount of each of the chocolate materials A and B into the mold 15 (see FIG. 1(e) by using the nozzle (FIGS. 1(a) through 1(d). That is, the chocolate materials A and B are radially arranged in a plurality of solid areas generally equally divided in an alternate fashion, and as shown in FIGS. 2(e) through 2(f), the foodstuff C is enclosed inside. It should be noted that the solid areas of the decorative chocolate respectively correspond to the aforementioned equally divided injection areas α and β within the mold 15.

In the above-described mode, the chocolate materials A and B and the foodstuff C are injected into the center of the mold 15 altogether after being bundled through the hopper 14, but it is also possible to inject the materials into the mold 15 without using the hopper 14. In that case, the chocolate materials A and B are first injected to the outer peripheral portion of the mold 15 so that the materials are caused to flow toward the center of the mold 15 along the inclined conical inner surface of the mold 15.

Example 2

A decorative chocolate 10' as shown in FIGS. 4(a) through 4(f) is manufactured by injecting white and brown chocolate materials A and B into the mold 15 (FIG. 3(e) through the nozzle section shown in FIGS. 3(a) through 3(c).

The instant embodiment differs from the embodiment in Example 1 in that, within the hopper 14, a perforated plate 14' is disposed provided with a total of sixteen discharge holes 14a' (a little smaller in diameter than the lower holes 13a and 13b') along the outer periphery thereof and a cylindrical food guide hole 14c at the center thereof. The remaining structure including the nozzle mounting plate 11, the nozzle pieces 12 and 13, the hopper 14 and the mold 15 is in common with the embodiment in Example 1.

Therefore, a description of a method of manufacturing a decorative chocolate using the above-described apparatus will be made with respect to what is different from the embodiment in Example 1.

Most portion near the center of each string of the white and brown chocolate materials A and B extruded in an alternate fashion from the third lower holes 13a and the fourth lower holes 13b' passes through the discharge holes 14a' in the perforated plate 14' as they are, but the remaining amounts near the periphery of each string of both of the white and brown materials are mixed together on the perforated plate to form a mixed pattern, and the mixture passes through the discharge holes 14a' from around the white or brown mono-color fluid chocolate material passing through the discharge holes 14a'. Consequently, a gradated pattern S appears around the white and brown mono-color fluid chocolate material extruded from each of the discharge holes 14a', and when these materials are injected into the mold 15 and cooled and solidified, the decorative chocolate 10' shown in FIG. 4 is produced.

Even when the perforated plate 14' is used, the foodstuff C is extruded through the central cylindrical body 14c of the plate 14', and flows down into the mold, being enclosed by the materials A and B.

Although the present invention has been described with reference to its preferred embodiments, the invention is not limited thereto, and therefore, it is also possible to obtain various kinds (based on the inner peripheral surface of the mold and various color combinations) of decorative chocolates of more than three colors by preparing three or more fluid chocolate materials, container sections, and nozzle pieces provided with various types of passages and small holes. Particularly, in the case of the embodiments in Examples 1 and 2, a more complicated decorative chocolate can be obtained by increasing the number of the upper holes in the nozzle mounting plate and the number of nozzle pieces mounted one on another, and taking the arrangement of the lower holes and the like into consideration.

Further, although a pattern having stripes appearing in an alternate fashion at predetermined intervals has been described in the embodiments, it is also possible to obtain a pattern wherein a plurality of such patterns as units are repeated in a planar direction.

Moreover, it is also possible to gradate the boundaries of each of the above-described various patterns by arranging a perforated plate provided with discharge holes or the like corresponding to the lower holes.

Although the present invention has been described with reference to the preferred embodiment, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A method for manufacturing a decorative food, including the steps of charging a mold with a plurality of kinds of fluid food materials, hardening said charged fluid food materials to obtain said decorative food, and taking off said hardened decorative food out of said mold:

said charging step comprising the steps of extruding said plurality of kinds of said fluid food materials in a multiple-string shape, on a material-by-material basis, and discharging a foodstuff in the middle of said fluid food materials in the middle of the step of extruding said fluid food materials, said step of extruding said fluid food materials including the steps of branching one of said fluid food materials in a horizontal direction to subdivide the same, branching another one of said fluid food materials in a horizontal direction to subdivide the same, and extruding said one of said subdivided fluid food materials and said another one of said subdivided fluid food materials in an alternate multiple-string shape into said mold, to thereby form a decoration with a diversified pattern.

2. The method of claim 1, wherein timing of said extruding step and said discharging step is controlled.

3. The method of claim 2, wherein said timing is controlled such that said discharging step is started in a delayed timing, while said extruding step is continued even after said discharging step is stopped, so that said foodstuff is enclosed by the fluid food materials.

4. The method of claim 1, wherein said charging step further comprises a step of bundling said fluid food materials extruded in a multiple-string shape and said foodstuff is discharged in the middle of said fluid food materials before the fluid food materials and foodstuff reach the mold.

5. The method of claim 1, wherein said charging step further comprises a step of gradating said fluid food materials extruded in a multiple-string shape before the fluid food materials reach the mold.

* * * * *

UNITED STATES PATENT AND TRADEMARK OFFICE
CERTIFICATE OF CORRECTION

PATENT NO.      : 6,361,811 B2
DATED           : March 26, 2002
INVENTOR(S)     : Tokuji Akutagawa It is certified that error appears in the above-identified patent and that said Letters Patent is hereby corrected as shown below:

Title page,
Item [73], the Assignee name of "Akutagawa Confectionery Co., Ltd." should be listed.

Signed and Sealed this

Twenty-sixth Day of November, 2002

Attest:

Attesting Officer

JAMES E. ROGAN
Director of the United States Patent and Trademark Office